United States Patent Office 2,766,274
Patented Oct. 9, 1956

2,766,274

ORGANIC SULFIDES AND THEIR PREPARATION

Albert L. Flenner, Wilmington, Del., assignor to E. I. du Pont de Nemours and Company, Wilmington, Del., a corporation of Delaware No Drawing. Application March 12, 1953,
Serial No. 432,034

4 Claims. (Cl. 260—500)

This invention relates to a novel crystalline organic sulfide, to the preparation of such compound, to its formulations for use as fungicides, and to processes for the control of fungi.

The compound of the invention can be obtained by the oxidation of an ethylene bis-dithiocarbamate. The oxidation process of the invention can be carried out, for example, in aqueous solution with such soluble ethylene bis-dithiocarbamates as sodium, potassium, tetramethylammonium, calcium, lithium, pyridinium, and similar water soluble ethylene bis-dithiocarbamates. Instead of using water as a solvent or reaction medium, the dithiocarbamate can be dissolved in any organic liquid which is oxidized with comparative difficulty, for example, it can be dissolved in methanol, ethanol, propanol, isopropanol, and the like.

The oxidation of the ethylene bis-dithiocarbamate is carried out preferably at a low temperature and in any event not greatly above room temperature. Preferably, the oxidation is conducted at as low a temperature, down to the freezing point of the solvent, as is economically practical.

The oxidation can be effected with such common oxidizing agents as hydrogen peroxide, bromine, chlorine, iodine, air, oxygen, or ozone.

The pH during the oxidation should not be allowed to rise substantially above that of the starting solution. When hydrogen peroxide, for example, is used, sodium hydroxide will be formed. This can be neutralized by the use of a suitable quantity of sulfuric acid or by the use of an ion-exchange resin. The pH, moreover, should not be allowed to drop below about 6. Preferably, the pH of the reacting mass is maintained within the range of about 6 to 10 thruout most of the reaction cycle.

The quantity of oxidizing agent to use is of course that stoichiometrically required. In the case of gases such as air and chlorine, the amount fed may, of course, be somewhat larger than that stoichiometrically required because not all will react, some passing thru the solution unreacted.

In order that the invention may be better understood, reference should be had to the following illustrative examples:

Example 1

1130 parts by weight of a solution of disodium ethylene bis-dithiocarbamate containing 34% by weight of the dithiocarbamate was diluted to 2500 parts with water.

To the dilute disodium ethylene bis-dithiocarbamate solution there was added slowly over a period of about 85 minutes a mixture of 170 parts by weight of 30% hydrogen peroxide and 153 parts by weight of 98% sulfuric acid in 700 parts by weight water. The temperature was maintained in the range of 7 to 17° C. during this addition. At the start of the addition, the pH of the dithiocarbamate solution was 11.01. It dropped rapidly to about 7.7 and thereafter remained within the range of about pH 6.6 to 8.9.

During the addition of the peroxide-containing solution, the organic sulfide product precipitated as a yellow colored crystalline solid. The solid crystalline product was separated by filtration, washed with water, and dried in vacuum. There was obtained 251 parts by weight of the organic sulfide of the invention.

The organic sulfide of this example was found by chemical analysis to have a sulfur to nitrogen atomic ratio of approximately 3 to 2. The crystalline product can be further identified by its powder X-ray diffraction picture which shows strong interplaner or interatomic spacing lines, in Angstroms, at d3.815 and d3.288. The product is believed to be ethylene thiuram monosulfide altho that exact structure has not been positively established.

The compound of the example is insoluble in hot acetone. By this, I mean that one gram of the organic sulfide is not dissolved in 500 mls. of acetone at the boiling point of the acetone at atmospheric pressure.

Example 2

The product of Example 1 was mixed and ground with talc and fuller's earth to provide a finely powdered mixture having the composition:

|                 | Percent |
|-----------------|---------|
| Organic sulfide | 5       |
| Talc            | 47.5    |
| Fuller's earth  | 47.5    |

This composition is useful for application by conventional dust applicators to vegetation for control of fungi.

In order to adapt the organic sulfide of the invention for use as a fungicide, the material is formulated according to conventional practices to provide a dust or a water dispersible powder or an emulsifiable oil or some such other form as is suitable for use in the usual applicator equipment. For this purpose, the active organic sulfide is admixed with a dust, a wetting, dispersing, or emulsifying agent, or a solvent or a combination of these materials, such added ingredients being commonly termed "pest control adjuvants" or "conditioning agents."

Dust compositions of the invention are prepared, for example, by mixing the active organic sulfide with a finely divided solid such as talc, pyrophyllite, natural clays, diatomaceous earths, and other powdered diluents such as those set out, for example, in U. S. Patent 2,426,-417.

A wide variety of wetting, dispersing, and emulsifying agents can be employed in preparing water dispersible dusts or emulsifiable oils of the invention. Such surface active materials are set out in detail in Bulletin E-607 of the Bureau of Entomology and Plant Quarantine of the U. S. Department of Agriculture and also in an article by McCutcheon in Chemical Industries, November, 1947, page 811 entitled "Synthetic Detergents".

The benefits of the fungicidal properties of the organic sulfide of the invention are realized by applying the sulfide to organic matter subject to fungicidal attack. A preferred use is for the control of fungus infestations of agriculture crops or ornamental plants. For such purposes, the fungicidal composition is applied either as a spray or a dust to the vegetation to be protected. The compositions of the invention can include other fungicidally acttive materials, insecticides, and the like as is usual in pest control compositions.

I claim:

1. An organic sulfide obtained by reacting a salt of ethylene bis-dithiocarbamic acid in liquid solution at a temperature not substantially above room temperature with a stoichiometric amount of an oxidizing agent while maintaining the pH of the reacting mass at pH 6 to pH 10 substantially throughout the reaction period, said organic sulfide being further characterized by having a sulfur to nitrogen atomic ratio of about 3 to 2 and being insoluble in hot acetone.

2. An organic sulfide obtained by reacting a salt of ethylene bis-dithiocarbamic acid in liquid solution at a temperature not substantially above room temperature with a stoichiometric amount of an oxidizing agent while maintaining the pH of the reacting mass at pH 6 to pH 10 substantially thruout the reaction period, said organic sulfide being further characterized by having a sulfur to nitrogen atomic ratio of about 3 to 2, being a crystalline solid with an X-ray diffraction picture having strong interatomic spacing lines at d3.815 and d3.288, in Angstroms, and being insoluble in hot acetone.

3. A process for making an organic sulfide comprising reacting a salt of ethylene bis-dithiocarbamic acid in liquid solution at a temperature not substantially above room temperature with a stoichiometric amount of an oxidizing agent while maintaining the pH of the reacting mass at pH 6 to pH 10 substantially throughout the reaction period.

4. A process for making the compound of claim 2 which comprises oxidizing a salt of ethylene bis-dithiocarbamic acid according to the process defined in claim 2.

References Cited in the file of this patent

UNITED STATES PATENTS

| | | |
|---|---|---|
| 2,340,650 | Dean | Feb. 1, 1944 |
| Re. 22,750 | Tisdale et al. | Apr. 30, 1946 |
| 2,407,566 | Mathes et al. | Sept. 10, 1946 |
| 2,693,485 | Goebeil | Nov. 2, 1954 |

FOREIGN PATENTS

| | | |
|---|---|---|
| 350,564 | Great Britain | June 15, 1931 |